United States Patent Office 3,199,984
Patented Aug. 10, 1965

3,199,984
METHOD OF PREPARING CHOCOLATE COATINGS
Otto G. Jensen, Tarrytown, N.Y., Anthony J. Shukis, Glen Rock, N.J., and James E. Bagan, Yonkers, N.Y., assignors to National Biscuit Company, New York, N.Y., a corporation of New Jersey
No Drawing. Filed Sept. 23, 1963, Ser. No. 310,851
4 Claims. (Cl. 99—23)

This application is a continuation-in-part of Serial No. 59,840, filed October 3, 1960, now abandoned, which was a continuation-in-part of Serial No. 466,950, filed November 4, 1954. This invention relates to hard butters and more specifically to hard butters used in chocolate coatings.

In the manufacture of chocolate coatings, the "nib" or decorticated cocoa bean is ground and blended with sugar, flavoring agents, cocoa butter and milk powder. Cocoa butter is unique in properties since it is a solid hard fat at room temperature, but melts completely and sharply at 95° F. In view of the fact that cocoa butter is expensive, many attempts have been made to find a cheaper fat in chocolate coatings. The fats used as substitutes for cocoa butter are called hard butters because of their property of combining good hardness at room temperature and sharp melting point at body temperature.

Standard coatings normally contain a hard butter, cocoa sugar, a flavoring agent and a small amount of an emulsifier, usually lecithin. Instead of just cocoa, mixtures of cocoa and chocolate liquor may be used, in which the chocolate liquor is present up to 5% of total composition.

One of the requirements is that the composition of a good hard butter be brittle at room temperature and have a rather sharp melting point in the range between 90° F. and 120° F.

Many methods have been proposed to obtain hard butters capable of replacing cocoa butter.

Heretofore the hard butters have been prepared from lauric acid-containing oils, such as coconut, palm kernel oil and babassu oil. The principal methods for the preparation of these hard butters are hydrogenation of oils to cause hardening, interesterification and fractional crystallization from different solvents. Although considerable success has been achieved in the preparation of hard butters, less expensive than cocoa butter, and still miscible with cocoa butter, one of the disadvantages of all hard butters is the development of an off-flavor which imparts a soapy taste to the finished coatings. The development of this soapy taste is unpredictable and although it does not occur in every preparation, still its occurrence has caused considerable embarrassment to the manufacturer and retailer.

It is the object of the invention to provide a method which permits the manufacture of a hard butter suitable for use in coating compositions without the development of off-flavors.

Another object is to provide a method for the preparation of hard butters with a sharp melting range in the region between 90° F. and 120° F.

Another object is to describe a process for the preparation of the finished coatings free from off-flavors.

In practicing the invention, there is utilized a vegetable glyceride oil which is free from lauric acid. Suitable oils within the scope of the invention are corn oil, cottonseed oil, olive oil, palm oil, peanut oil, rice bran oil, soybean oil and sunflower oil. Mixtures of lauric acid-free vegetable oils within the scope of the invention.

The glyceride is partially hydrogenated. This hydrogenation which is conducted catalytically, is carried out to lower the unsaturation. Since the starting oils comprise substantial amounts of oleic, linoleic and linolenic acids, the object of the hydrogenation is to reduce any flavor instability of the type due to residual unsaturation. Also, the choice of the starting oils, free from lauric acid, permits the preparation of coating compositions free from the low molecular weight C-12 lauric acid, a factor critical for the elimination of off-flavors. The extent of hydrogenation is carefully controlled, to give a melting point of the hard butter between 105° and 114° F.

Although not essential to the process of this invention, the hydrogenated triglyceride or a mixture of the hydrogenated glycerides may be subjected to catalytic interesterification. It is also possible to subject the triglyceride or a mixture of the triglycerides to interesterification first, folowed by hydrogenation. The interesterification is conducted at a low temperature, below 300° F. according to the method well known in the art, in the presence of a catalyst, usually sodium methoxide. The purpose of the interesterification is to rearrange the product, to give a random distribution of fatty acids.

The hard butters obtained from lauric acid-free glycerides in accordance with the invention, with or without interesterification, developed no off-flavor on prolonged storage, in direct contrast with the coating compositions containing hard butters which contain lauric acid.

Although any explanation for the formation of the soapy taste and off-flavors of the hard butters containing glycerides of lauric acid may be speculative, it seems that the soapy taste is due to an hydrolysis of the vegetable fats with formation of the free fatty acids. When the fatty acid is lauric acid, even a small amount of the free acid is sufficient to give noticeable off-flavors. The hydrolysis of the glycerides seems to be due to a number of factors, namely the presence of an enzyme, lipase, sufficient moisture and suitable temperature. Thus the preparation of hard butters free from the glycerides of lauric acid, eliminates the possibility of off-flavors even on storage, because high-molecular weight fatty acids, if present, would not cause off-flavors and would be unnoticed.

The coating compositions comprising the hard butters of this invention, comprises a dispersion of finely ground cocoa solids, sugar, salt, a flavoring agent and an emulsifier in the hard butter rather than in cocoa butter. A milk chocolate additionally comprises 12% of milk solids. The fat content of the cocoa should be between 10 and 12%, not over 14%. The respective amounts of cocoa solids, sugar, milk solids, flavoring agent and emulsifier may be varied to give sweet, dark, bittersweet and milk coatings. No matter whether the product is a dark or light coating, the total amount of hard butter varies between 26 and 38%, preferably 30 to 35%. The emulsifier is usually added to the hard butter in amount of 4–8 ounces per 100 lbs. of hard butter. Typical formulations for chocolate coatings are shown below:

DARK SWEET COATING

|  | Broad Range, Percent | Preferred Range, Percent |
|---|---|---|
| Cocoa | 14–21 | 19–21 |
| Hard Butter | 26–38 | 31–33 |
| Powdered Sugar | 37–47 | 40–42 |
| Salt | 0.1–0.3 | 0.2–0.3 |
| Emulsifier | 0.25–1.5 | 0.25–0.50 |
| Flavor | 0.1–0.2 | 0.1–0.2 |

LIGHT SWEET COATING

|  | Broad Range, Percent | Preferred Range, Percent |
|---|---|---|
| Cocoa | 5-12 | 8-9 |
| Hard Butter | 26-38 | 31-33 |
| Powdered Sugar | 50-60 | 50-52 |
| Dry Skim Milk | 0-10 | 7-9 |
| Flavor | 0.1-0.2 | 0.1-0.2 |
| Salt | 0.1-0.2 | 0.1-0.2 |
| Emulsifier | 0.25-1.5 | 0.25-0.50 |

Satisfactory flavoring agents for use with hard butter coatings are vanillin and ethyl vanillin.

As an emulsifying agent, in addition to lecithin, several other products which are synthetic may be used, for instance polyoxyethylene esters of higher fatty acids, triglycerides of fatty acids, mono and diglycerides and the palmitates of sorbitan. It has also been found advantageous to use mixtures of Span 60, Tween 60 and lecithin. Span 60 is sorbitan monostearate, and Tween 60 is polyoxyethylene-20 sorbitan monostearate.

A dark sweet coating containing Span 60 and Tween 60 in addition to lecithin has the following percentage composition:

Formula, percent
Cocoa powder _____ 20.0
Hard butter _____ 31.5
Powdered sugar _____ 40.9
Skim milk powder _____ 6.0
Powdered salt _____ 0.2
Vanillin _____ 0.1
Span 60 _____ 0.5
Tween 60 _____ 0.5
Lecithin _____ 0.3
                                        ___
                                        100

A light sweet coating containing Span 60 and Tween 60 in addition to lecithin, has the following percentage composition:

Formula, percent
Cocoa powder _____ 8.0
Hard butter _____ 31.5
Powdered sugar _____ 51
Skim milk powder _____ 8.0
Powdered salt _____ 0.1
Vanillin _____ 0.1
Span 60 _____ 0.5
Tween 60 _____ 0.5
Lecithin _____ 0.3
                                        ___
                                        100

An improved procedure for manufacturing the compound coatings of this invention is as follows: The hard butter is melted to a temperature of 130°–140° F. in a thermostatically controlled mixing tank. Approximately 2 to 4% of the total fat is not initially melted, but added later. The emulsifiers, one-half of the lecithin and all of the dry ingredients are added to the melted fat and blended at 130° to 145° F., for a period of time sufficient to insure proper dispersion and wetting of the ingredients, usually one-half hour. The blended coating mass is then run through a 5-roll refiner. For this purpose the powdered sugar particle size range prior to refining is preferably between 6X and 10X. The refined coating is then remelted to 130°–140° F., placed in a mixing tank for 12 to 14 hours. Finally the remaining portion of the hard butter and of the lecithin are added. The finished coating is then pumped to the holding tanks where it is stored at 115° F.

An alternative procedure, which eliminates the use of the 5-roll refiner, consists of refining the powdered sugar in a suitable pulverizer and then screening through a 325 mesh screen. The sugar utilized has a particle size of 44 microns or smaller. Then the sugar is added to the melted fat, followed by the other ingredients and emulsifier.

In order to indicate more fully the nature of the present invention, the following examples of typical procedures are set forth, in which "part" and "percent" are by weight unless otherwise indicated. It is to be understood that these examples are presented as illustrative only and that they are not intended to limit the scope of the invention.

Example 1

Thirty-one pounds of partially hydrogenated peanut oil of melting point 114° F., that is about 41.6% hydrogenation, are charged into a jacketed kettle and melted. To the resultant melt is added 0.3 pound of lecithin. The temperature is adjusted to 140–145° F. and the mixture mechanically stirred for 30 minutes. The following ingredients are then added, in the indicated sequence, namely 18 pounds cocoa, 6 pounds skim milk powder, 45 pounds sugar, 0.2 pound salt and 0.1 pound vanillin. The flavor is usually added last. Mixing is continued for at least 30 minutes, maintaining the temperature at 140–145° F. Lastly, the mixture is passed through a mill or refining roll to produce a smooth coating. Before enrobing, the coating is tempered.

Enrobed cookies made in accordance with the above described procedure are found to be free of deleterious tastes, even beyond the usual active shelf life of the product. The length of time required for agitation varies according to the temperature. If the blending temperature is kept at 170° F., the time may be shortened to 20 minutes.

Example 2

The procedure described in Example 1 was repeated from peanut oil, but the hydrogenated peanut oil was interesterified. A coating composition was prepared as in Example 1. The product was free from off-flavors.

Example 3

A dark sweet chocolate coating was prepared as follows. Thirty-one pounds of peanut oil hard butter of melting point 114° F. were melted, combined with 1.5 ounces of lecithin, the temperature of the mixture adjusted to 140°–145° F. The mixture was then subjected to mechanical stirring for 30 minutes. The following ingredients were then added in the sequence given: 20 pounds of Dutched cocoa, 42 pounds of sugar, 6 pounds of spray dried skim milk, 2 ounces of salt, and 1 ounce of vanillin. Mechanical agitation was continued for an additional 30 minutes, maintaining the temperature at 140°–145° F. The mixture was then passed through a refining roll. The refined coating was then remelted to 130°–140° F. and placed in a mixing tank for a period of 12 to 24 hours. An additional pound of hard butter and 1.5 ounces of lecithin were added. The composition was then kept in tanks at 115° F. under moderate agitation of 12 to 20 r.p.m. for tempering and storing. The resulting compound coating gave no off-flavors even on storage.

Example 4

The same composition was used as in Example 3, but the peanut oil hard butter had a melting point of 105° F., that is the hydrogenation had been conducted to about 35%.

Example 5

The same composition was used as in Example 3, but the hard butter was prepared by hydrogenation of cottonseed oil and had a melting point of 114° F., that is the hydrogenation was conducted to about 50.9%. In another preparation, cottonseed oil of M.P. 111° F. was used, corresponding to 48% hydrogenation. The results were satisfactory in every instance, and the products gave no undesirable off-flavors on storage.

Example 6

A light sweet chocolate coating was prepared from 30 pounds of peanut oil hard butter of M.P. 114° F., 9 pounds of natural cocoa, 52 pounds of sugar, 9 pounds of spray dried skim milk, 2 ounces of salt, 3 ounces of lecithin, and 1 ounce of vanillin. The sugar was finely pulverized and passed through a 325-mesh screen, so that only sugar of particle size, 44 microns or smaller, was used. The resulting coating was smooth and no further refining was necessary. The product gave no off-flavors, even on prolonged storage.

Example 7

A sweet milk chocolate type coating was prepared from 32 pounds of peanut oil hard butter, of M.P. 114° F., 6 pounds of cocoa, 46 pounds of sugar, 8 pounds of spray dried whole milk, 8 pounds of spray dried skim milk, 2 ounces of salt, 3 ounces of lecithin, 1 ounce of vanillin. The hard butter, except one pound which was used later and 1.5 ounces of lecithin, were melted by heating to 130°–140° F. Then the dry ingredients were added and blended at 130°–140° F. to obtain proper dispersion and wetting throughout the mixture.

The blended coating mass was then run through a 5-roll refiner. The refined coating was then remelted to 130°–140° F. and placed in a mixing tank for a period of 12 to 24 hours. Finally the remaining portion of the hard butter and 1.5 ounces of lecithin were added. The coating composition was then pumped to holding tanks kept at 115° F. under moderate agitation, at 15 r.p.m. for storage. The resulting composition gave a very satisfactory compound coating, free from off-flavors.

What is claimed is:

1. In the art of enrobing an edible food with a chocolate type coating wherein a hard butter is combined with a cocoa-containing material which is a member selected from the group consisting of cocoa, and mixtures of cocoa with chocolate liquor containing up to 5% of chocolate liquor, and an emulsifier, sugar, skim milk powder, salt, and flavor are added, the improvement which comprises (1) hydrogenating a lauric acid-free oil which is a member selected from the group consisting of corn oil, cottonseed oil, olive oil, palm oil, peanut oil, rice bran oil, soybean oil and sunflower oil, to a hard butter of melting point of 105°–114° F., (2) then adding said emulsifier, cocoa and chocolate liquor, sugar, skim milk powder, salt, and flavor, said hard butter being present in proportion of 26 to 38%, said cocoa being present in proportion between 5 and 21%, said sugar being present between 37 and 60%, salt between 0.1 and 0.3%, said emulsifier being present between 0.25 and 1.5%, and said flavor between 0.1 and 0.2%.

2. In the art of enrobing an edible food with a chocolate type coating comprising a cocoa-containing material, which is a member selected from the group consisting of cocoa, and mixtures of cocoa with up to 5% of chocolate liquor, the improvement which comprises hydrogenating peanut oil until the melting point is 114° F., to obtain a hard butter, adding to 31 pounds of said hard butter 0.3 pound of lecithin, melting said mixture of hard butter and lecithin, maintaining the temperature thereof at 140°–145° F. for a period of 30 minutes, then adding 18 pounds of cocoa, 6 pounds of skim milk powder, 45 pounds of sugar, 0.2 pound of salt, 0.1 pound of vanillin, mixing at 140°–145° F. for at least 30 minutes, refining, tempering and enrobing.

3. The process according to claim 2, wherein said sugar is pulverized and screened through a 325-mesh screen.

4. The process according to claim 1, wherein the flavor is a member selected from the group consisting of vanillin and ethyl vanillin.

References Cited by the Examiner

UNITED STATES PATENTS

| | | | |
|---|---|---|---|
| 2,468,799 | 5/49 | Ziels et al. | 99—18 X |
| 2,586,615 | 2/52 | Cross | 99—23 |

OTHER REFERENCES

Bailey: Industrial Oil and Fat Products, 1951, Interscience Publ., Inc., N.Y., p. 827.

A. LOUIS MONACELL, *Primary Examiner.*